(12) United States Patent
Loukianov

(10) Patent No.: US 6,636,971 B1
(45) Date of Patent: Oct. 21, 2003

(54) METHOD AND AN APPARATUS FOR SECURE REGISTER ACCESS IN ELECTRONIC DEVICE

(75) Inventor: Dmitrii Loukianov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/366,426

(22) Filed: Aug. 2, 1999

(51) Int. Cl.[7] .................................................. G06F 1/26
(52) U.S. Cl. ........................ 713/189; 713/176; 713/200; 713/201
(58) Field of Search ................................ 713/176, 193, 713/200, 189; 709/208, 229

(56) References Cited

U.S. PATENT DOCUMENTS 5,727,061 A * 3/1998 Johnson et al. ............. 713/165
5,748,738 A * 5/1998 Bisbee et al. ............... 713/176

* cited by examiner

Primary Examiner—Thomas R. Peeso
(74) Attorney, Agent, or Firm—Fish & Richardson P.C.

(57) ABSTRACT

A secure register in a cable modem is accessed only if properly encrypted data is received. The properly encrypted data is encrypted with a private key known only to a cable modem termination station. The data is decrypted with the public key stored in the cable modem. If the data and digital signature match, then the result of a hash function verifies that the data write is authorized. Configuration data, such as bandwidth data can be written only to the protected register in the cable modem, only if the data matches. Otherwise, the writing is prohibited. The method allows to securely access registers in electronic device remotely, using insecure communication media or channel. The method can be used to restrict access to critical data in registers or memory elements of a device, including ASICs, Flash and EEPROM memory components, to only positively authenticated sources of data.

20 Claims, 3 Drawing Sheets

METHOD AND AN APPARATUS FOR SECURE REGISTER ACCESS IN ELECTRONIC DEVICE

The disclosed system describes secure register access in a communication device, e.g., a cable modem.

BACKGROUND

Operation of a cable modem can be carried out according to the Data Over Cable Service Interface Specification ("DOCSIS") 1.0 specification, Cable Television Laboratories, Inc., 1996. This specification describes a cable modem architecture that uses time division multiple access ("TDMA") techniques to provide access to the cable network. The cable network is a shared transmission medium. The communications from each of the cable modems takes a different time slot within the transmission.

The cable modem termination station ("CMTS") determines and sets the grants of access based on information about the remote cable modems. Typically, each cable modem is allowed a maximum bandwidth that is based on the plan that the cable modem user subscribes to, and pays for.

According to the DOCSIS 1.0, however, the cable modem termination station does not store its own information about bandwidth utilization parameters. Instead, this information is reported by each of the remote cable modems themselves. This cable modem termination station can access the information from the cable modems, to determine the amount of bandwidth utilization. The cable modem termination station is provided also with a mechanism to remotely alter the bandwidth allocation in the cable modem, once the system operator decides to modify the initially set configuration.

This approach can pose a security risk. Since the remote station must be able to modify configuration by accessing the device registers, an unauthorized user or "hacker", could also get access to these registers and get unlimited bandwidth control by changing the values within their own cable modem or produce other unexpected problems. In particular, this could fool the cable modem termination station to allocate excess bandwidth without the service provider's authorization. Therefore, a secure method to remotely control the configuration by writing data into configuration register is required.

SUMMARY

A secure remote access system of the present invention has a first, non protected, storage element, and a second, protected storage element that stores protected information, and is physically protected, for instance, by embedding it in a chip together with access protection circuit. A data transfer mechanism is connected to both the first and second storage elements. The data transfer mechanism operates at least partly with characteristics based on information in the second storage element. A security element detects security of an incoming message, and allowing the incoming message write access to the second protected storage element, only when security is verified. The remote access system can be a modem of a type that can operate in different modes, e.g. configurations or a different data transfer rates.

The disclosed system describes security for preventing unauthorized modifications to certain registers in the cable modem using encryption techniques. All, or only those critical registers, e.g. those used to store or control some aspect of the data transfer mechanism, e.g. bandwidth allocation information, may have restricted access. Only write operations to these registers are restricted in this embodiment, although the method allows to selectively assign access rights to read and write data on a per-register basis.

A disclosed mode uses public key cryptography, and a hash function that detects the control information change.

The operations to the registers are protected by using encryption techniques in a non-standard way to protect the information.

BRIEF DESCRIPTION OF THE DRAWINGS

These and other aspects will be described in detail with reference to the accompanying drawings, wherein.

DETAILED DESCRIPTION

Figure 3:
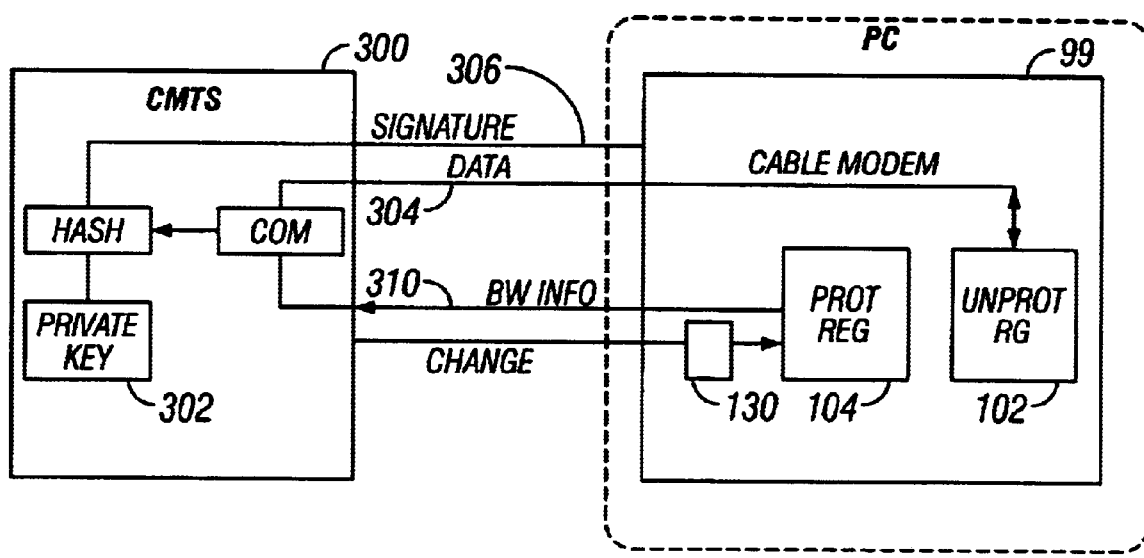
FIG. 3 shows a block diagram of the overall system of a secure cable modem of an embodiment.

The present system operates in the environment of a data transfer mechanism, e.g. a cable modem architecture as shown in FIG. 3. However, any system that uses public communication mechanism, e.g., data bus, stores protectable information in its internal storage can use the concepts of the disclosed system.

Figure 1:
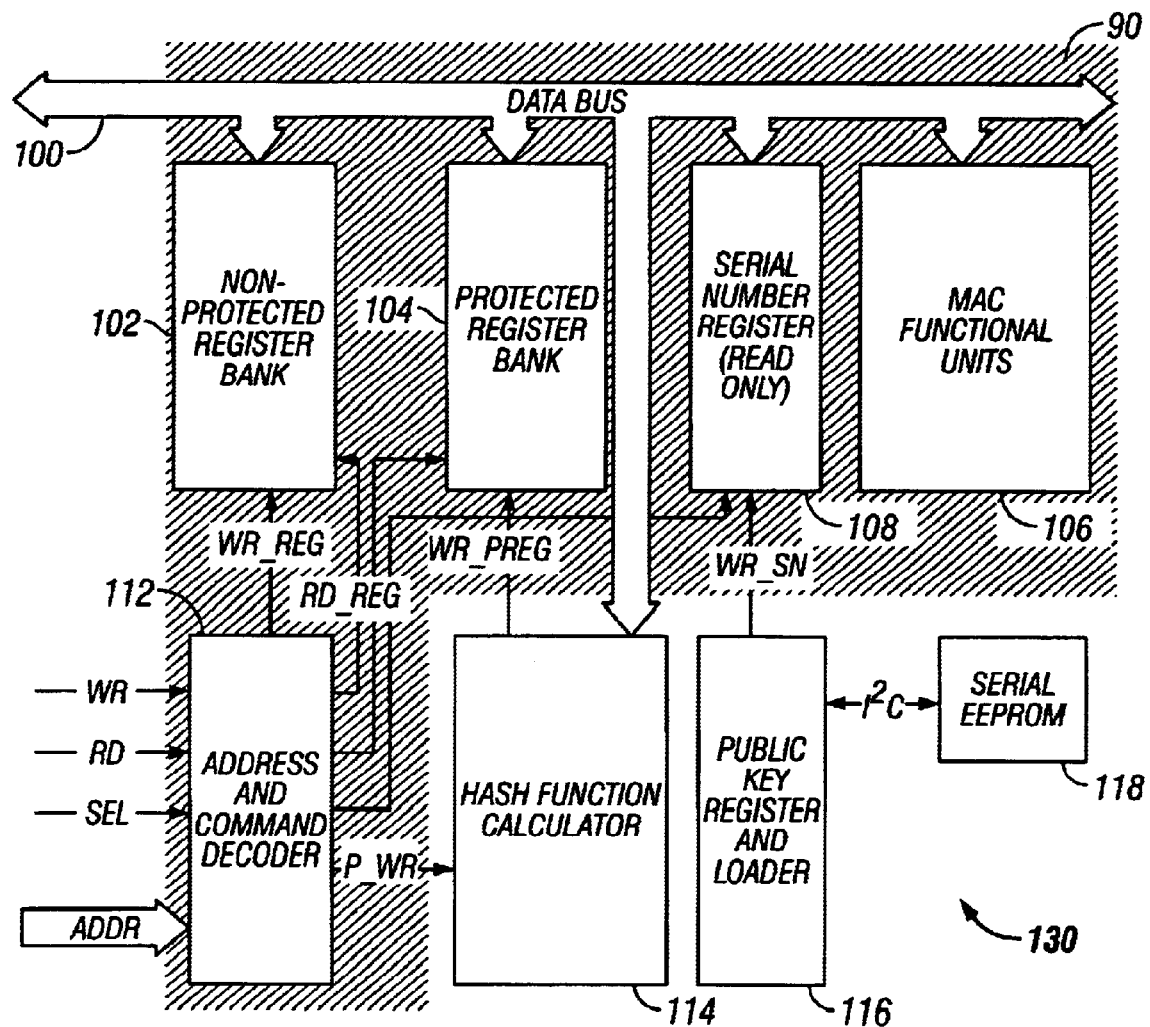
FIG. 1 shows a block diagram of a first embodiment.

The bus controller architecture as used in the cable modem is shown in FIG. 1. This bus controller relies on a digital signature technique to protect write cycles to protected registers.

The architecture includes a data bus 100 connected to the functional parts. These parts include a non protected register bank 102 and a protected register bank 104. Protected register bank 104 requires encryption techniques for altering stored data. The functional parts 90 also include media access controller ("MAC") functional units 106. The MAC units support communication protocol in the cable modem unit, and provide data connectivity between termination station and cable modem. These carry out, inter alia, the data transfer mechanism.

A read only memory 108 includes the serial number of the unit, and/or public key for data decryption.

A disclosed mode uses public key cryptography authenticate the data access and to protect the registers. Public key authentication is an asymmetric cryptography scheme that uses a pair of keys for encryption. A private (secret) key is used to encrypt data, and a corresponding public key is used to decrypt the authentication data or digital signature. A digital signature enables the recipient of information to verify the authenticity of the information's origin.

A hash function includes techniques which decrease the amount of data processing needed for a decryption scheme. A hash function is a one way function that takes variable length input, e.g. a message of any length, and produces a fixed length output. The hash function has a property that if the information is changed in any way, a different output value is obtained.

A secure hash function ensures that there is no way to take a signature from one document and attach it to another without knowing (or breaking) the cryptographic scheme.

The operations to the registers are protected by using these encryption techniques in a novel way to control the data access to the registers on chip.

In one embodiment, control and address signals are connected to an address and command decoder 112. These signals are used to control and access both the non-protected register 102, and the protected register 104. In addition, certain commands from the decoder are routed to a hash function calculator register 114 which calculates the hash function based on the remote access data. The hash function calculator may be implemented as a state machine that has a relatively low gate count.

Additional encryption and decryption is carried out by a public key register and a loader 116 which is connected to a rewritable memory, e.g. an EEPROM 118, that stores the public key.

The protection circuit 130 either approves or denies access to the protected register 104 based on a digital signature within the command which accesses the protected register 104. In this embodiment, the data can only be written into the protected register when WR_PREG (write into protected register signal) become activated by the protection circuit 130.

An incoming (remote) command contains both data to be written to the protected register 104, and also a signature that is the hash function of the data to be written to the register, which is encrypted with the private key of the issuer of the command. Each protected command is forwarded to the chip 99 and its data field is processed in the hash function calculator 114. The encrypted hash field is decrypted, using the public key in EEPROM 118. If both generated and decrypted hashes match positively, then the signal WR_PREG is produced, indicating a write to the protected register. The protection circuit 130 does not generate the WR_PREG write strobe unless the digital signature in the incoming data is decoded as a match. Therefore, any write access commands generated without knowing the private key will be rejected.

Any public key cryptography system such as PGP, available from Network Associates, Inc., of Santa Clara, Calif., could be used for the digital signature encryption.

The cable modem termination station 300 uses the cable modem termination station's private key, stored in memory 302, to generate the signature of the remote access command. Both the binary code of the command 304 and a digital signature 306 are hence generated at the CMTS and sent to the cable modem. Since the private key is never released to the cable modem, a hacker could not obtain its contents without cracking the cryptographic system. While the hacker would be able to copy exactly an intercepted command, the hacker could not modify that command in any way without causing the hash function to fail.

Thereafter, the stored bandwidth information 310 can be accessed from the cable modem and sent to CMTS 300.

Simple Network Management Protocol (SNMP) control commands that the CMTS uses to control modems, may also need to be translated into protected commands if they require the access to secured registers. This can be done in real time by an SNMP agent in the PC or in the cable modem SNMP. This agent may require the private key to form a command that passes the hash function, however, which forms a potential security hole.

Two aspects are preferred for dealing with this security hole. First, a special category of SNMP rights may be defined within the cable modem. This special category can include "canned", or previously generated and signed access commands. By using these commands, the hacker can only produce the changes that are authorized by the operator of the system. The hacker cannot generate own commands which are different from the fixed, "canned" commands. In this case, neither the cable modem, nor the PC, needs to have the private key.

A second possibility is that the SNMP rights to the critical registers may always be disabled in SNMP. Updates to these registers would only be possible via downloading a new firmware image including new, "canned", protected commands.

Both of these techniques limit the use of the private key to signing commands at the CMTS only so the cable modem does not need to obtain the CMTS private key.

The FIG. 1 embodiment uses the serial EEPROM 118 to store the public key. However, the algorithms used to generate each key pair are typically a public standard. Therefore, a hacker could still defeat this system by overwriting the EEPROM with a new public key to form a fake public/private key pair, e.g. by using an EEPROM programmer. The hacker could then form a fake commands to change the configuration in the cable modem, because both private and public keys are available.

Figure 2:
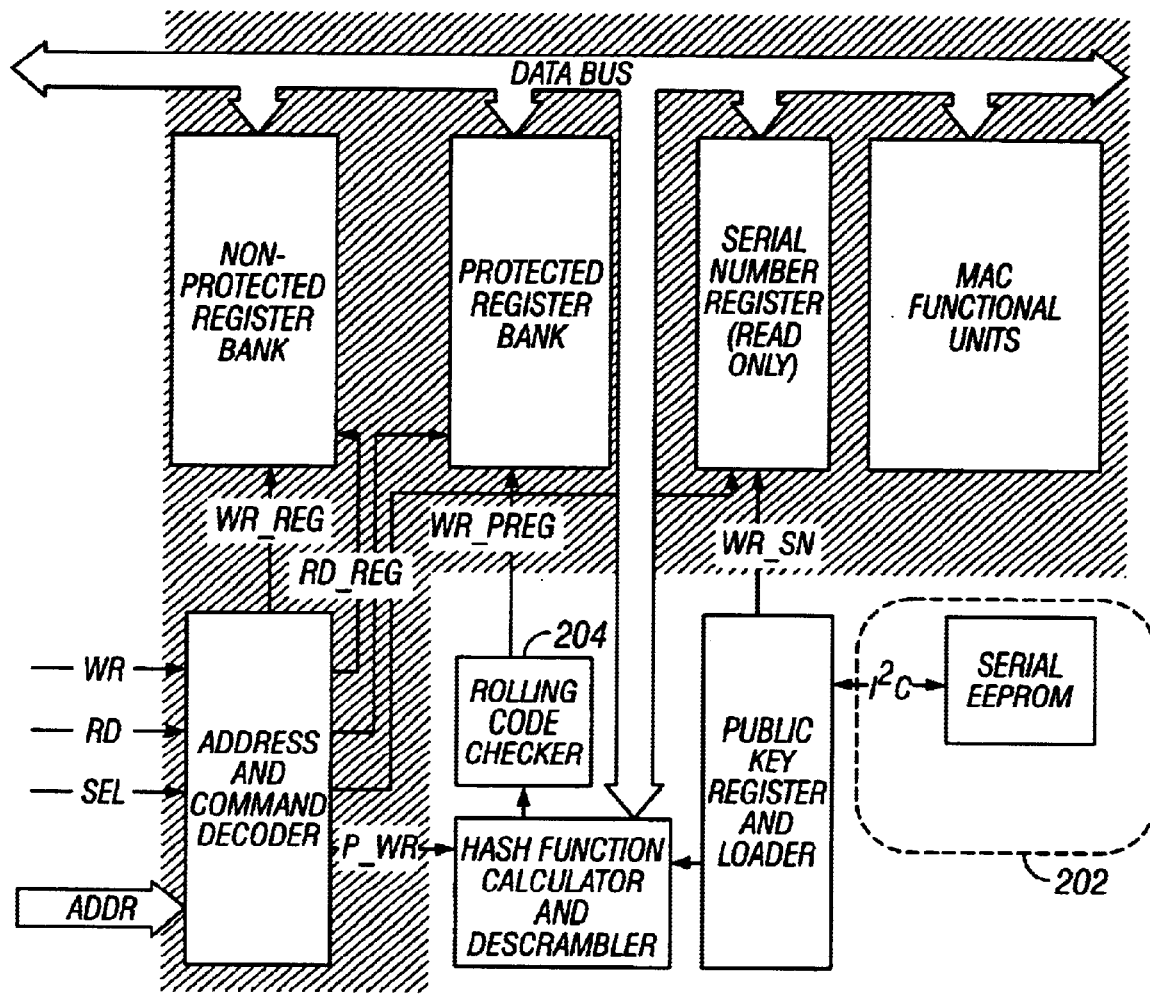
FIG. 2 shows a block diagram of a second embodiment with additional securities.

FIG. 2 shows a second embodiment with additional enhancements that may make it more difficult to bypass the security feature. The FIG. 2 system includes physical protection in the EEPROM, shown as 202. The physical protection could include, for example, putting the EEPROM in epoxy, including the memory as part of the chip 99, or using a secure storage device such as a smart card. Then, the EEPROM may be itself protected from writing by the same mechanism, which will render its modification unfeasible.

Another possible security hole is when the digital signature and data block total size are greater than a reasonable bus size. This may allow information to be loaded in the chip as a series of write cycles on the external bus. A hacker could use a debugger or software tool to intervene within this sequence to inject desired data within the sequence, after the access has been already granted or after the data access sequence has been entered.

This can be handled by scrambling the data and signature fields. One data technique uses a scrambling technique which interleaves the data and digital signature fields on the bit level. In this way, there is no discrete spot where a hacker could intervene.

Another enhancement to avoid this security hole is shown in FIG. 2. Rolling code checker 204 uses rolling code technique for accessing registers. A write command must include a "rolling" sequence number. This sequence number changes at each cycle. The sequence number is compared against the expected transaction or sequence state that is internally generated within the chip. The rolling code checker 204 checks the sequence and does not allow writing unless the sequences match. Any out-of-sequence command issued during control of the cable modem will disable all subsequent access commands.

A message can be sent to the cable modem termination station to inform the station about possible tampering.

These extra security measures can result in slight increases in gate count.

The rolling code checker requires that the cable modem termination station and cable modem are continuously synchronized. One way to ensure this is by continuous conductivity between the cable modem and the termination station.

An alternative way to ensure connectivity and synchronization is by periodically using the cable modem to send an encrypted message to the cable modem termination station using the public key in EEPROM 118. The cable modem termination station uses its private key to decrypt the message.

The present method has been described in the context of a cable modem. However, this method has other applications. Any system in which hardware will be installed on a user's premises and could be tampered with, could make use of the proposed mechanism.

For instance, this could be used in any modem such as an asymmetric data ADSL modem, a pay television card, computer firmware upgrades or in any other protected device that is installed locally but needs to be controlled or configured remotely. The method described herein protects selected registers within the device from unauthorized access using a digital signature technique. Also, similar methods to those described above can be used to update the register or memory unit that stores the public key. Since this register may reside on the device, write access to the register can be granted only by certain licensed software, or hardware vendors, or only to selected entities. In any case, some physical security to the key is desirable.

What is claimed is:

1. A secure remote access system, comprising:
    a first non protected storage element associated with a first end-user device;
    a second, protected storage element that stores protected information, also associated with said first end-user device;
    a data transfer mechanism, connected to both said first and second storage elements, and operating at least partly with characteristics based on information in said second storage element; and
    a security element, detecting security of an incoming message from a central remote authority, which his remote from the end-user device, and allowing said incoming message write access to said second protected storage element, only when security is verified by said data transfer mechanism wherein said security element includes a digital signature verifying element, which operates both on incoming data and on a digital signature associated with said incoming data, to verify that said incoming data is associated with said digital signature.

2. A system as in claim 1 wherein said digital signature verifying element includes a hash function calculator.

3. A system as in claim 1 wherein said digital signature verifying element includes a public key of a public cryptography system.

4. A system as in claim 3 further comprising a memory unit storing said public key, and physical protection associated with said memory unit.

5. A system as in claim 1 wherein said security element produces a signal enabling write or read, or both access to said second storage element, and wherein writing or reading, or both to said second storage element is prohibited unless said signal is active.

6. A system as in claim 1 wherein said digital signature verifying element includes an element which produces an access enable signal to indicate verified information and produces a access denial signal to indicate unverified information.

7. A system as in claim 1 further comprising a rolling code checker, storing a sequence number associated with an operation, and insuring that said sequence number matches a received sequence number.

8. A system as in claim 1, wherein said data transfer mechanism is a modem unit and said characteristics include an allowable data transfer rate of said modem unit.

9. A method of controlling access to a data transfer mechanism, comprising:

operating an aspect of the data transfer mechanism based on a stored value in a memory location in an end-user device;
    detecting if an incoming message from a remote central authority matches a desired security indicia by obtaining a public key of a public key cryptography system from an on board memory in the end-user device, and processing an incoming message using said public key to verify security of said incoming message and, allowing modification the stored value in said on board memory, by the remote central authority, when said security is verified.

10. A method as in claim 9 wherein said detecting comprises calculating and decrypting a hash function using said stored public key and at least part of said incoming message.

11. A method as in claim 9 further comprising maintaining a transaction number for said incoming message, and verifying said transaction number against an expected transaction number.

12. A method as in claim 9, further comprising accessing a memory storing said stored value using said incoming message only if said security is verified.

13. A method as in claim 12, wherein said data transfer mechanism is a modem unit and said aspect includes an allowable data transfer rate of said modem unit, and wherein said stored value that is accessed indicates an allowable data transfer rate.

14. A cable modem system, comprising:
    a functional unit controlling communications with a cable modem termination station;
    at least one memory in the cable modem including a protected register, said protected register including information controlling a bandwidth of said functional unit; and
    a protection circuit, receiving an incoming data command from a central controlling facility remote from the cable modem to change contents of said protected register, verifying a security of said incoming data command, and allowing said protected register to be changed by the command from the central facility only if security of said incoming data command is detected to be correct.

15. A system as in claim 14 further comprising a rewritable memory, storing an encryption key for use by said protection circuit.

16. A system as in claim 15 further comprising further physical protection against tampering associated with said rewritable memory.

17. A system as in claim 15 wherein said unauthorized write cycle detecting device includes a rolling sequence checker.

18. A system as in claim 14 wherein said protection circuit includes a hash function calculator that calculates a hash function to verify said security.

19. A system as in claim 14 wherein said protection circuit includes a device which detects an unauthorized write cycle to determine if said security is correct.

20. A system as in claim 14 wherein said protection circuit includes an interleaving circuit that interleaves security information with data information.

* * * * *